United States Patent [19]

Scherer

[11] Patent Number: 5,692,957

[45] Date of Patent: Dec. 2, 1997

[54] TEMPERATURE-CONTROLLED TORQUETRANSMITTING; MAGNET COUPLING SYSTEM

[75] Inventor: Hans-Georg Scherer, Geretsried, Germany

[73] Assignee: Feodor Burgmann Dichtungswerke GmbH & Co., Wolfratshausen, Germany

[21] Appl. No.: 620,311

[22] Filed: Mar. 22, 1996

[30] Foreign Application Priority Data

Mar. 28, 1995 [DE] Germany ............ 295 05 250 U

[51] Int. Cl.⁶ ............ H02K 9/19; F04B 39/06; F04D 29/58
[52] U.S. Cl. ............ 464/17; 464/29
[58] Field of Search ............ 464/17, 29; 417/420

[56] References Cited

U.S. PATENT DOCUMENTS 5,288,213  2/1994  Nasr ............ 417/420

FOREIGN PATENT DOCUMENTS 3 639 719 A1  6/1988  Germany.
42 12 982 A1  10/1993  Germany.
29500108 U  2/1995  Germany.

Primary Examiner—Daniel P. Stodola
Assistant Examiner—Gregory J. Strimbu
Attorney, Agent, or Firm—Griffin, Butler, Whisenhunt & Kurtossy

[57] ABSTRACT

A magnet coupling system has driving and driven coupling elements, each of which has a magnetic element thereon between which a gap is defined through which a can passes. The magnet coupling system includes a sleeve bearing apparatus comprising a pair of axially spaced sleeve bearings. The sleeve bearing apparatus has a bearing casing enclosing both sleeve bearings and defines a closed fluid flow chamber through which a temperature-control fluid is circulated from an external source. An outer circumference of the bearing casing exchanges heat with an inner circumferential surface of the driven coupling element, and is accommodated substantially-completely within the driven coupling element, to heat or cool the sleeve bearing apparatus and the driven coupling element, and thus the gap between the magnet elements, to a suitable temperature.

4 Claims, 1 Drawing Sheet

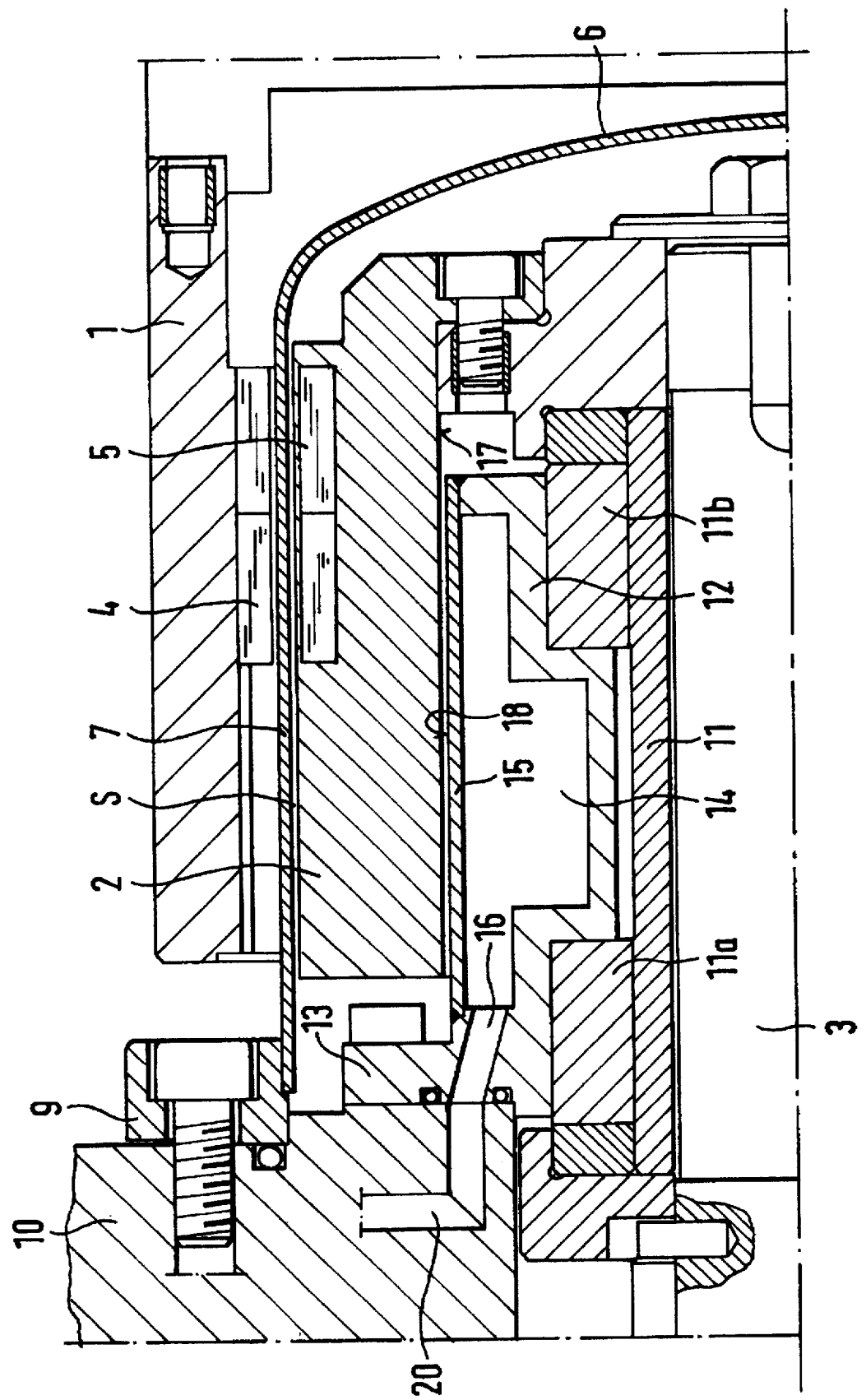

TEMPERATURE-CONTROLLED TORQUETRANSMITTING; MAGNET COUPLING SYSTEM

BACKGROUND OF THE INVENTION

This invention relates generally to magnet couplings and more particularly to magnet coupling systems for employment in pumps, agitators or the like at low temperatures, i.e. applications in which "freezing up" of the magnet couplings is to be feared.

In such applications care must be taken to heat the magnet couplings otherwise torque transfer may not result or may result only with considerable losses.

A prior art proposal for indirectly heating via a pump housing, or by means of a temperature control fluid introduced into a double-walled can configuration, is either inadequately effective —since not all portions of a magnet coupling at which relative rotations of components occur can be covered —, or is too complicated and prone to defects. Double-walled cans mean, in addition an enlarged radial dimension of a magnet gap due to greater wall thickness of the can, related corresponding losses in a torque transfer capacity of coacting magnet elements of the magnet coupling. A known magnet coupling (German patent publication DE-A-3639719), which includes introduction of a temperature control fluid via a double-walled can, additionally configures the can to be sufficiently rigid that it can support a stationary part (also coming into contact with the temperature control fluid) of one of two spaced sleeve bearings which holds an output shaft of the magnet coupling. This design not only requires a special configuration of a shaft bearing arrangement, which despite its complexity is only useful for an application having low demands on the bearings, but also only permits temperature control of one of the two sleeve bearings, so that special measures need to be taken to prevent the other sleeve bearing from freezing up. Practical experience has further indicated that these known measures often involve exceptionally long warm-up times and undesirably high environmental heat emissions, and thus, high energy losses.

It is an object of this invention to provide an effective temperature-control arrangement for a magnet coupling which covers substantially all rotating portions of the magnet coupling and which can be made inexpensively.

SUMMARY OF THE INVENTION

A magnet coupling system which achieves this object and serves to transmit a torque between a driving mechanism and a shaft, has: concentric driving and driven coupling elements with respective driving and driven magnet elements mounted thereon which are separated by a gap; a portion of a non-rotatable can passing through the gap; and an apparatus for circulating a temperature-control fluid through a stationary part of a sleeve bearing apparatus, comprising a pair of axially spaced sleeve bearings, holding the shaft; the magnet coupling system being characterized by a combination of the following features:

a) the stationary part of the sleeve bearing apparatus is a bearing casing enclosing both sleeve bearings and having a sealed fluid flow chamber therein, b) the bearing casing comprises inlet and outlet passages porting the fluid flow chamber, the inlet and outlet passages being connectable with external fluid inlet and outlet conduits outside of the magnet coupling, c) the bearing casing is related by its outer circumference in a heat-transferring, radially spaced, concentric manner to an inner circumferential surface of the driven coupling element, and d) the bearing casing is substantially contained in the driven coupling element.

BRIEF DESCRIPTION OF THE DRAWINGS

The invention will now be described in more detail on the basis of an embodiment and the drawing.

FIG. 1 is a longitudinal cross-sectional view showing an upper half of a magnet coupling and shaft configured in accordance with this invention.

DESCRIPTION OF THE PREFERRED EMBODIMENT

A magnet coupling includes, as shown, a driving coupling element 1 and a driven coupling element 2, each in the form of tubular or bushing-shaped elements, disposed concentrically, radially spaced from each other and as carriers of driving and driven magnet element 4 and 5 respectively. Each magnet element 4, 5 includes a plurality of permanent magnets disposed circumferentially which are oriented with respect to the respective oppositely located permanent magnets so that a torque acting on the driving coupling element 1 is transmitted via the magnet elements 4, 5 to the driven coupling element 2. The driving coupling element 1 may be connected to a drive motor (not shown).

A can 6, which hermetically seals off from the environment a product-end portion of the magnet coupling containing the driven coupling element 1, includes a cylindrical section 7 which passes through a gap between the magnet elements 4, 5 as is indicated at 9, is fixedly connected to a housing 10 of a pump or the like.

The driven coupling element 2 is further fixed to a shaft 3 to which an element, e.g. a pump impeller, agitator or the like, to be driven is connected. The shaft 3 is supported concentrically with respect to the coupling elements 1, 2 on the housing 10 by means of a sleeve bearing apparatus, denoted by the general reference number 11.

The sleeve bearing apparatus 11 includes a pair of axially spaced sleeve bearings 11a, 11b, the stationary bearing parts of which are held in an annular bearing casing 12 which, as is indicated at 13, is secured to the housing 10 of the apparatus. The bearing casing 12 has a cross-sectional configuration which is generally concave facing radially outwardly and which, in conjunction with an outer tubular cover or closure wall 15, defines an annular chamber 14 which is sealed relative to its surroundings, through which a temperature control fluid may be circulated via inlet and outlet passages 16 (only one shown) porting into the chamber 14. The inlet and outlet passages 16 are connected via external fluid inlet and outlet conduits 20 (only one shown), which may be provided, for example, in the case 10 of the apparatus.

The bearing casing 12 has preferably a cross-sectional configuration, as is described in German Industrial Design (Gebrauchmuster) DE-U-295 00 108.9 and is distinguished by an intermediate portion of the bearing casing 12 between the sleeve bearings 11a, 11b being configured not as a rigid, compact body but as a flexible wall element, so that the bearing casing 12 permits a centering movement of the sleeve bearings 11a, 11b relative to one another. As a result of this configuration of the bearing casing 12 the annular flow chamber 14 has an intermediate portion having a greater fluid handling capacity than side portions adjoining the sleeve bearings 11a, 11b, in that the intermediate portion has a greater radial dimension than do the side portions. Regarding further details, reference is made to the aforementioned publication. It will be appreciated that the invention is not restricted to such a configuration of the bearing casing 12, but that also other suitable configurations may be provided to allow a sealed circulation of the temperature control fluid in the bearing casing 12.

The inlet and outlet conduits 20 are connected respectively to an external apparatus (not shown) for controlling a temperature of the fluid. This apparatus may be designed to heat or cool the temperature control fluid or both for heating as well as for temperature control.

The bearing case 12 is contained substantially completely within the driven coupling element 2, the tubular closure wall 15, which outwardly defines the chamber 14 of the bearing casing 12, being in a close, radially-spaced, concentric relationship with an inner circumferential surface 17 of the driven coupling element 2, so that between an outer circumferential surface 18 of the closure wall 15 and the inner circumferential surface 17 of the driven element 2 only a narrow gap remains.

The temperature control fluid circulating through the chamber 14 results not only in temperature control of the sleeve bearings 11a, 11b but also in a heating of the driven coupling element 2, by outwardly-emitted heat from the closure wall 15 being quite-effectively transmitted to the driven coupling element 2 and from there to a gap S between the can 6 and the driven magnet element 5, to also create or maintain a suitable temperature in these portions.

Continual or temporary heating is necessary, for example, in the case of magnet couplings for driving centrifugal pumps or agitators for low temperature media delivery or handling, to bring or maintain a medium which has penetrated into the gaps of the magnet coupling to/at a condition (as regards its viscosity) in which rotation of the moving parts of the magnet coupling can occur with zero loss, where possible. In this way, freezing up of the magnet coupling may be eliminated when the pump is started. In other areas of application cooling of the sleeve bearing apparatus 11 and/or of adjacent parts of the magnet coupling is achievable with a cooling fluid circulated through the chamber 14.

The invention accordingly provides a flow passage for a temperature control fluid in a stationary casing which involves both sleeve bearings and which is in a heat-transfer relationship with the driven coupling element, to bring the latter to a suitable temperature. This flow passage is created, with minimum construction expense, in the form of a chamber in the bearing casing of the sleeve bearing apparatus. The heating is achieved specifically without any substantial high-loss heat emission to the environment, so that the heating-up time and/or the energy consumption are less than with known heating measures. The invention permits, in particular, also an effective temperature control of both sleeve bearings without this requiring a special configuration of the can. The can may have instead a usual and preferred single-walled configuration. The invention has been described on the basis of a preferred embodiment, it will be appreciated, however, that it is not restricted thereto. For instance, the term "flow chamber" for temperature control fluid also includes a tubular winding suitably installed on the bearing casing through which the temperature control fluid may pass. Any suitable liquid may be employed as the temperature control fluid, since the temperature control fluid does not come into contact with the magnet coupling outside of the flow passage due to the hermetic seal with respect to the environment.

What is claimed is:

1. A magnet coupling system for transmitting torque between a driving means and a shaft, said magnet coupling system having:

driving and driven coupling elements disposed concentrically to one another, with each of said driving and driven coupling elements having magnetic elements thereon, the magnetic elements of the driving and driven coupling elements coacting with one another but defining a gap therebetween, said driven coupling element adapted to be coupled to said shaft;

a can having a non-rotatably-mounted portion passing through the gap;

a sleeve bearing apparatus comprising a stationary part for supporting a pair of axially spaced sleeve bearings adapted for holding the shaft; and, a fluid-circulating means for circulating a temperature-control fluid through the stationary part of said sleeve bearing apparatus, wherein:

a) the stationary part of the sleeve bearing apparatus includes an annular-shaped bearing casing encircling both of the sleeve bearings and defining a sealed fluid flow chamber therein;

b) the bearing casing comprises inlet and outlet passages porting the fluid flow chamber which are for connecting to external fluid inlet and outlet conduits external of the magnet coupling system;

c) an outer circumference of the bearing casing is adjacent to, radially-inwardly-spaced from, and concentric with, an inner circumferential surface of the driven coupling element so that heat is transferred radially therebetween; and d) the bearing casing is substantially accommodated within the driven coupling element.

2. A magnet coupling system as set forth in claim 1, wherein said fluid flow chamber is a substantially annular-shaped cavity in said bearing casing.

3. A magnet coupling system as set forth in claim 1, including an external temperature-control means for connecting to said fluid inlet and outlet conduits for influencing the temperature of said temperature control fluid.

4. A magnet coupling system as set forth in claim 1, wherein said bearing casing has a continuous cylindrical outer peripheral wall.

* * * * *